US012597170B2

(12) United States Patent
Ryu et al.

(10) Patent No.: US 12,597,170 B2
(45) Date of Patent: Apr. 7, 2026

(54) METHOD AND APPARATUS FOR IMMERSIVE VIDEO ENCODING AND DECODING, AND METHOD FOR TRANSMITTING A BITSTREAM GENERATED BY THE IMMERSIVE VIDEO ENCODING METHOD

(71) Applicant: RESEARCH & BUSINESS FOUNDATION SUNGKYUNKWAN UNIVERSITY, Suwon-si (KR)

(72) Inventors: Eun Seok Ryu, Seoul (KR); Jong Beom Jeong, Yangju-si (KR); Soon Bin Lee, Seongnam-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 291 days.

(21) Appl. No.: 18/116,452

(22) Filed: Mar. 2, 2023

(65) Prior Publication Data

US 2023/0334706 A1      Oct. 19, 2023

(30) Foreign Application Priority Data

Apr. 15, 2022      (KR) ........................ 10-2022-0047153
Jan. 11, 2023      (KR) ........................ 10-2023-0003994

(51) Int. Cl.
*G06K 9/00*      (2022.01)
*G06T 7/11*      (2017.01)
(Continued)

(52) U.S. Cl.
CPC .................. *G06T 9/00* (2013.01); *G06T 7/11* (2017.01); *G06T 7/40* (2013.01); *G06T 7/60* (2013.01); *G06V 10/24* (2022.01)

(58) Field of Classification Search
CPC ..... G06T 9/00; G06T 7/11; G06T 7/40; G06T 7/60; G06V 10/24
See application file for complete search history.

(56) References Cited

U.S. PATENT DOCUMENTS 11,991,376 B2 *  5/2024  Boyce .................. H04N 19/597
2020/0154121 A1 *  5/2020  Boyce ................ H04N 21/2365
(Continued)

FOREIGN PATENT DOCUMENTS

EP            3840389 A1 *  6/2021  ............. G06T 9/002
WO      WO-2020232281 A1 *  11/2020  ........... H04N 19/124
WO      WO-2021067503 A1 *  4/2021  ............. H04N 19/20

OTHER PUBLICATIONS

Delivering Object-Based Immersive Video Experiences, Basel Salahieh et al., IS&T, 2021, pp. 103-1 to 103-7 (Year: 2021).*

(Continued)

*Primary Examiner* — Jayesh A Patel
(74) *Attorney, Agent, or Firm* — NSIP Law

(57)            ABSTRACT

Disclosed herein are an immersive image encoding/decoding method and apparatus, and a method for transmitting a bitstream generated by the immersive image encoding method. An immersive image encoding method according to the present disclosure may include: generating geometry atlases for an immersive image; aligning the geometry atlases to make an alignment height of the geometry atlases correspond to a height of a texture atlas; and generating a geometry bitstream by encoding the aligned geometry atlases.

13 Claims, 10 Drawing Sheets

(51) Int. Cl.

| | |
|---|---|
| *G06T 7/40* | (2017.01) |
| *G06T 7/60* | (2017.01) |
| *G06T 9/00* | (2006.01) |
| *G06V 10/24* | (2022.01) |

(56) References Cited

U.S. PATENT DOCUMENTS

| | | | | |
|---|---|---|---|---|
| 2020/0359000 A1* | 11/2020 | Shin | | H04N 13/156 |
| 2021/0099687 A1* | 4/2021 | Shin | | H04N 19/37 |
| 2021/0195162 A1* | 6/2021 | Chupeau | | H04N 21/816 |
| 2021/0383122 A1* | 12/2021 | Jeong | | G06F 18/25 |
| 2023/0222694 A1* | 7/2023 | Oh | | G06T 7/194 |
| | | | | 382/232 |
| 2023/0239508 A1* | 7/2023 | Boyce | | G06T 9/005 |
| | | | | 375/240.12 |
| 2023/0247222 A1* | 8/2023 | Boyce | | G06V 10/764 |
| | | | | 375/240.12 |
| 2023/0345020 A1* | 10/2023 | Yu | | G06T 7/50 |
| 2023/0353770 A1* | 11/2023 | Kang | | H04N 19/70 |
| 2023/0362409 A1* | 11/2023 | Chupeau | | H04N 19/70 |

OTHER PUBLICATIONS

MPEG Immersive Video Coding Standard, Jill M. Boyce et al., IEEE, Mar. 10, 2021, pp. 1521-1536 (Year: 2021).*

Sub-bitstream packing based lightweight tiled streaming for 6 degree of freedom immersive video, Jong-Beom Jeong et al., Wiley, 2021, pp. 973-976 (Year: 2021).*

Simplified carriage of MPEG immersive video in HEVC bitstream, Mengyu Chen et al., SPIE, 2021, pp. 1-9 (Year: 2021).*

Patch Decoder-Side Depth Estimation in MPEG Immersive Video, Marta Milovanovic et al., IEEE, 2021, pp. 1945-1949 (Year: 2021).*

Enhanced pruning algorithm for improving visual quality in MPEG immersive video, Hong-Chang Shin et al., ETRI, 2021, pp. 73-84 (Year: 2021).*

Delivering Object-Based Immersive Video Experiences, Basel Salahieh et al., IS&T, 2021, pp. 103-103-7 (Year: 2021).*

Jeong, Jong-Beom, et al., "Extraction and Merging on Frame Packed Video", Sungkyunkwan University (SKKU), ISO/IEC JTC1/SC29/WG4, Apr. 2021, (8 Pages in English).

Jeong, Jong-Beom, et al., "Geometry Packing Implementation in TMIV for Frame Packed Video", Sungkyunkwan University (SKKU), ISO/IEC JTC 1/SC 29/WG4, Apr. 2022, (10 Pages in English).

* cited by examiner

Fig. 2A

Fig. 3B texture geometry 4096 x 2176

2048 x 1088

(a)

texture geometry #0 geometry #1

(b)

texture geometry #0 geometry #1

5120 x 2176
2 x 1 tile (c)

METHOD AND APPARATUS FOR IMMERSIVE VIDEO ENCODING AND DECODING, AND METHOD FOR TRANSMITTING A BITSTREAM GENERATED BY THE IMMERSIVE VIDEO ENCODING METHOD

CROSS REFERENCE TO RELATED APPLICATIONS

The present application claims priority to a KR provisional application 10-2022-0047153, filed Apr. 15, 2022, and a KR application 10-2023-0003994, filed Jan. 11, 2023, the entire contents of which are incorporated herein for all purposes by this reference.

BACKGROUND OF THE INVENTION

Field of the Invention

The present disclosure relates to a method for encoding and decoding an immersive image and, more particularly, to an immersive image encoding/decoding method and apparatus, which pack geometry atlases and merge the geometry atlases with texture atlases, and to a method for transmitting a bitstream generated by the immersive image encoding method.

Description of the Related Art

Virtual reality services can generate full 360-degree images (or omni-directional images, 360-degree images or immersive images) in realistic or computer graphics (CG) formats and play such images on a personal VR unit like a head mounted display (HMD).

Virtual reality service evolves to maximize senses of immersion and realism by implementing 6 degrees of freedom (DoF) image streaming beyond simple 360-degree VR images. That is, the virtual reality service are developing toward playing an image through an HMD so that it can be viewed by a viewer moving in six directions including left-and-right translation, up-and-down rotation, up-and-down translation, and left-and-right rotation.

However, the current virtual reality service provides 3DoF in playing a realistic image obtained from a camera, where up-and-down rotation and left-and-right rotation are mainly sensed, and no image related to a viewer's left-and-right translation and up-and-down translation cannot be provided.

Accordingly, in order to provide a perfect and natural stereoscopic image by playing images corresponding to up-and-down rotation and left-and-right rotation, atlases generated by an encoder need to be suitably divided and packed and then merged in efficient positions of texture atlases.

SUMMARY

The present disclosure is directed to provide an encoding/decoding method and apparatus for adaptive streaming and a transmitting method.

In addition, the present disclosure is directed to provide a method for dividing a geometry atlas.

In addition, the present disclosure is directed to provide a method for packing divided geometry atlases.

In addition, the present disclosure is directed to provide a method for merging packed geometry atlases in efficient positions of texture atlas.

In addition, the present disclosure is directed to provide a method for signaling and obtaining information on packing.

In addition, the present disclosure is directed to provide a method for transmitting a bitstream generated by an immersive image encoding method or apparatus according to the present disclosure.

In addition, the present disclosure is directed to provide a recording medium storing a bitstream generated by an immersive image encoding/decoding method or apparatus according to the present disclosure.

In addition, the present disclosure is directed to provide a recording medium storing a bitstream which is received and decoded by an image decoding apparatus according to the present disclosure and is used to reconstruct an immersive image.

Technical objects of the present disclosure are not limited to the above-mentioned technical objects, and other technical objects that are not mentioned will be clearly understood by those skilled in the art through the following descriptions.

An immersive image encoding method according to an aspect of the present disclosure, which is performed in an immersive image encoding apparatus, may include: generating geometry atlases for an immersive image; aligning the geometry atlases to make an alignment height of the geometry atlases correspond to a height of a texture atlas; and generating a geometry bitstream by encoding the aligned geometry atlases.

An immersive image decoding method according to an aspect of the present disclosure, which is performed in an immersive image decoding apparatus, may include: obtaining, from a bitstream, first information indicating whether or not an atlas for an immersive image has packed data; obtaining, from a bitstream, second information indicating whether or not the atlas has packed geometry data; and obtaining packing information for the atlas based on the first information and the second information.

An immersive image encoding apparatus according to an aspect of the present disclosure may include a memory and at least one processor, and the at least one processor may be configured to generate geometry atlases for an immersive image, to align the geometry atlases to make an alignment height of the geometry atlases correspond to a height of a texture atlas, and to generate a geometry bitstream by encoding the aligned geometry atlases.

A method for transmitting a bitstream according to an aspect of the present disclosure, which is generated by an immersive image encoding method, and the immersive image encoding method may include: generating geometry atlases for an immersive image; aligning the geometry atlases to make an alignment height of the geometry atlases correspond to a height of a texture atlas; and generating a geometry bitstream by encoding the aligned geometry atlases.

The features briefly summarized above with respect to the present disclosure are merely exemplary aspects of the detailed description below of the present disclosure, and do not limit the scope of the present disclosure.

According to the present disclosure, as geometry atlases are packed at a same height as a height of a texture atlas, merging efficiency may be improved.

In addition, according to the present disclosure, since geometry atlases are merged to the right of a texture atlas, it is possible to overcome a constraint of division according to a size of a predetermined unit region, and division may be implemented to match the capability of an immersive image decoding apparatus.

Effects obtained in the present disclosure are not limited to the above-mentioned effects, and other effects not mentioned above may be clearly understood by those skilled in the art from the following description.

BRIEF DESCRIPTION OF THE DRAWINGS

FIG. 2A and FIG. 2B are views schematically showing TMIV (Test Model for Immersive Video) encoder and decoder according to an embodiment of the present disclosure.

FIG. 3B is a view schematically showing a pipeline of an immersive image decoding apparatus to which embodiments of the present disclosure are applicable.

DETAILED DESCRIPTION OF THE INVENTION

Figure 1:
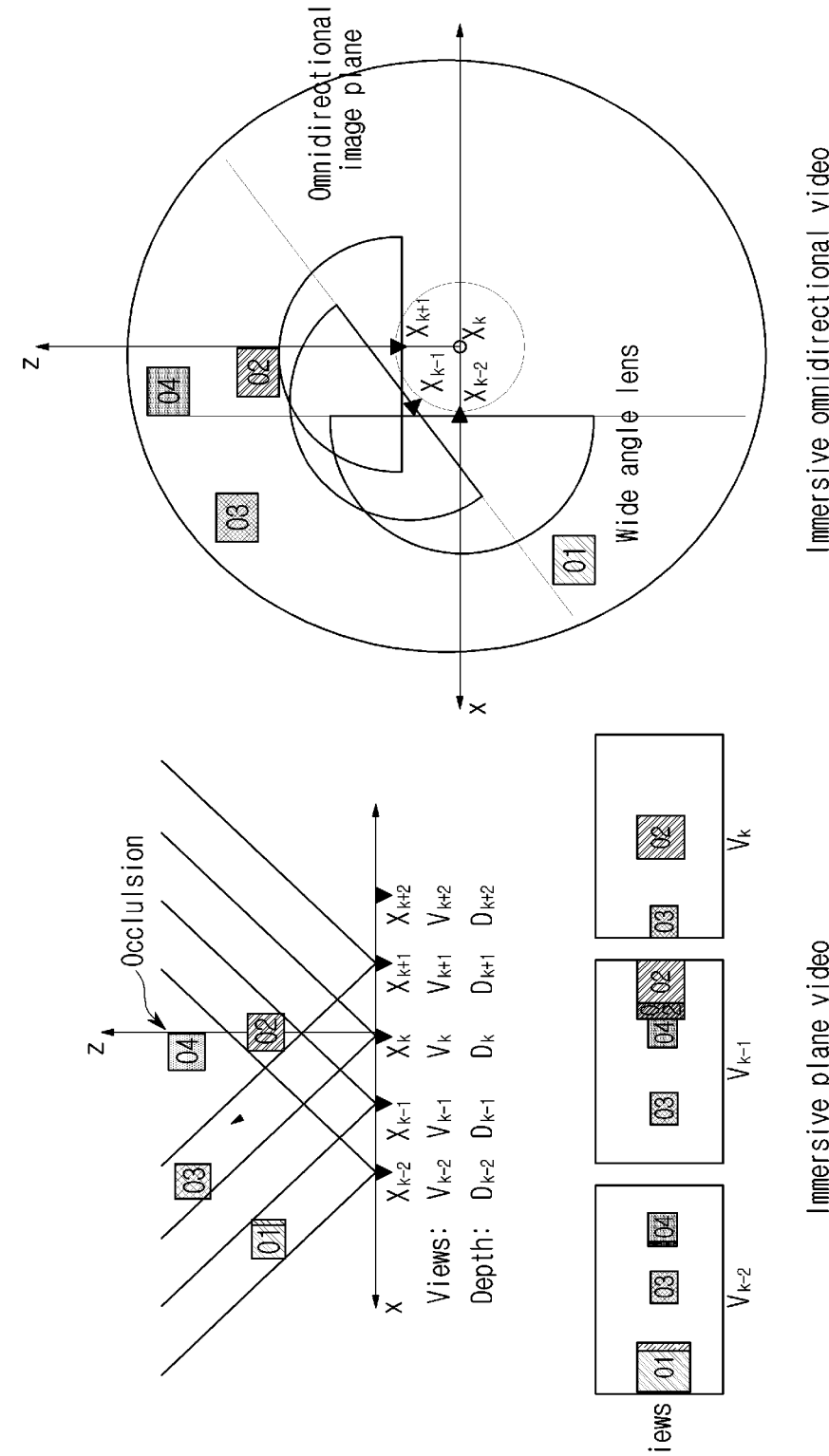
FIG. 1 is a view showing a concept of a multi-view image in an immersive video according to an embodiment of the present disclosure.

Hereinafter, the embodiments of the present disclosure will be described in detail with reference to the accompanying drawings, so that they can be easily implemented by those skilled in the art. However, the present disclosure may be embodied in many different forms and is not limited to the exemplary embodiments described herein.

In the following description of the embodiments of the present disclosure, a detailed description of known configurations or functions incorporated herein will be omitted when it may make the subject matter of the present disclosure rather unclear. Also, in the drawings, parts not related to the description of the present disclosure are omitted, and like parts are designated by like reference numerals.

In the present disclosure, when a component is referred to as being "linked", "coupled", or "connected" to another component, it may encompass not only a direct connection relationship but also an indirect connection relationship through an intermediate component. Also, when a component is referred to as "comprising" or "having" another component, it may mean further inclusion of another component not the exclusion thereof, unless explicitly described to the contrary.

In the present disclosure, the terms first, second and the like are used only for the purpose of distinguishing one component from another, and do not limit the order or importance of components, etc. unless specifically stated otherwise. Thus, within the scope of the present disclosure, a first component in one embodiment may be referred to as a second component in another embodiment, and similarly a second component in one embodiment may be referred to as a first component in another embodiment.

In the present disclosure, components that are distinguished from each other are intended to clearly illustrate respective features, which does not necessarily mean that the components are separate. That is, a plurality of components may be integrated into one hardware or software unit, or a single component may be distributed into a plurality of hardware or software units. Thus, unless otherwise noted, such integrated or distributed embodiments are also included in the scope of the present disclosure.

In the present disclosure, components described in the various embodiments are not necessarily essential components, and some may be optional components. Accordingly, embodiments consisting of a subset of the components described in one embodiment are also included in the scope of the present disclosure. Also, an embodiment that includes other components in addition to the components described in the various embodiments is also included in the scope of the present disclosure.

In the present disclosure, "/" and "," may be interpreted as "and/or". For example, "A/B" and "A, B" may be interpreted as "A and/or B". In addition, "A/B/C" and "A, B, C" may mean "at least one of A, B and/or C".

In the present disclosure, "or" may be interpreted as "and/or". For example, "A or B" may mean 1) only "A", 2) only "B", or 3) "A and B". Alternatively, in the present disclosure, "or" may mean "additionally or alternatively".

In the present disclosure, the terms image, video, immersive image and immersive video may be used interchangeably.

Hereinafter, embodiments of the present disclosure will be described in detail with reference to the accompanying drawings. In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

FIG. 1 is a view showing a concept of a multi-view image in an immersive video according to an embodiment of the present disclosure.

Referring to FIGS. 1, O1 to O4 may represent a region of an image in an arbitrary scene, Vk may represent an image obtained at a camera center position, Xk may represent a view position (camera position), and Dk may represent depth information at a camera center position.

In an immersive video, an image may be generated at a plurality of positions in various directions in order to support 6 DoF according to a user's movement. An immersive video may consist of an omnidirectional image and relevant spatial information (depth information, camera information). An immersive video may be transmitted to a terminal side through image compression and packet multiplexing processes.

An immersive video system may obtain, generate, transmit and reproduce a large immersive video consisting of multi views. Accordingly, an immersive video system should effectively store and compress massive image data and be compatible with an existing immersive video (3DoF).

Figure 2A:
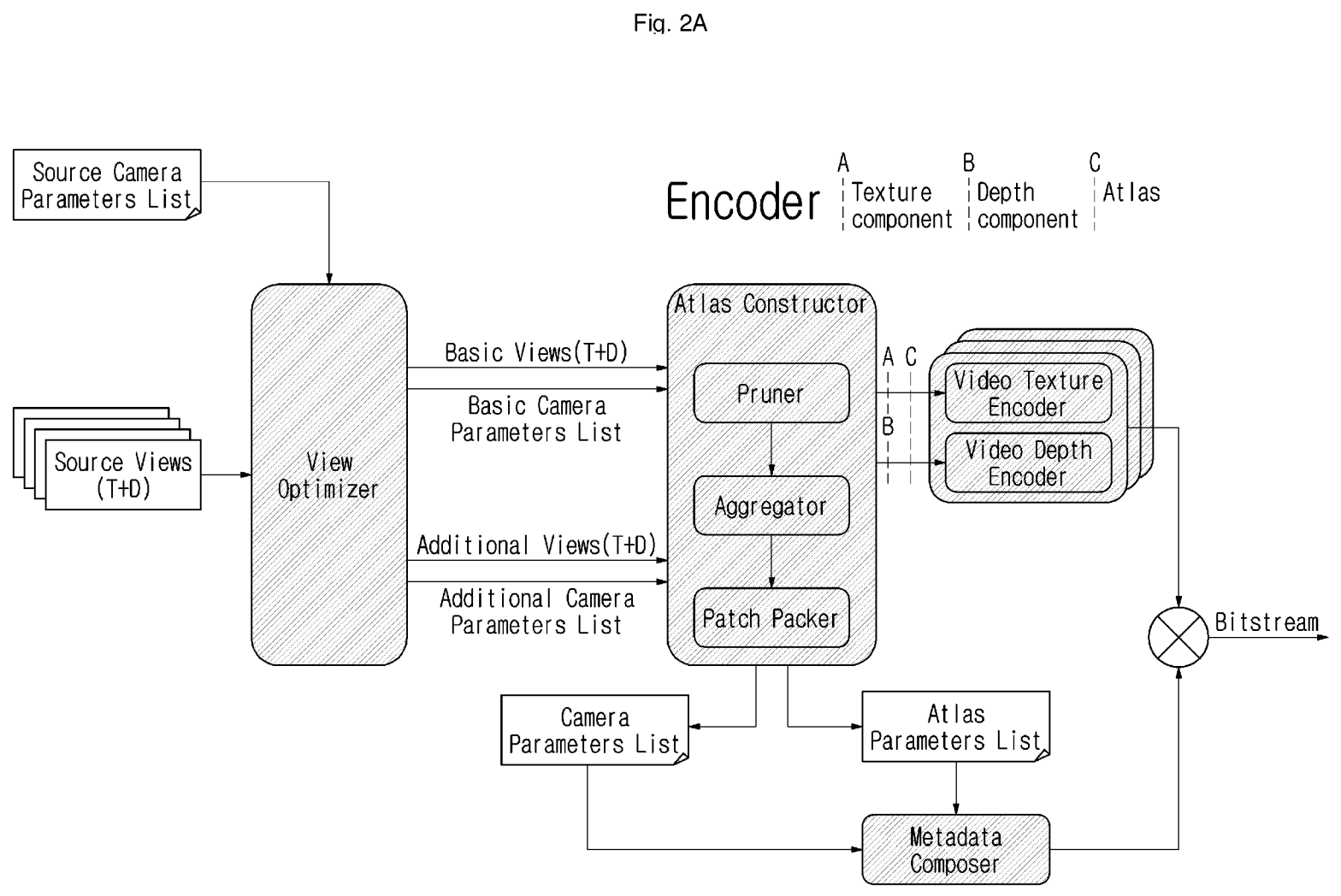
Figure 2B:
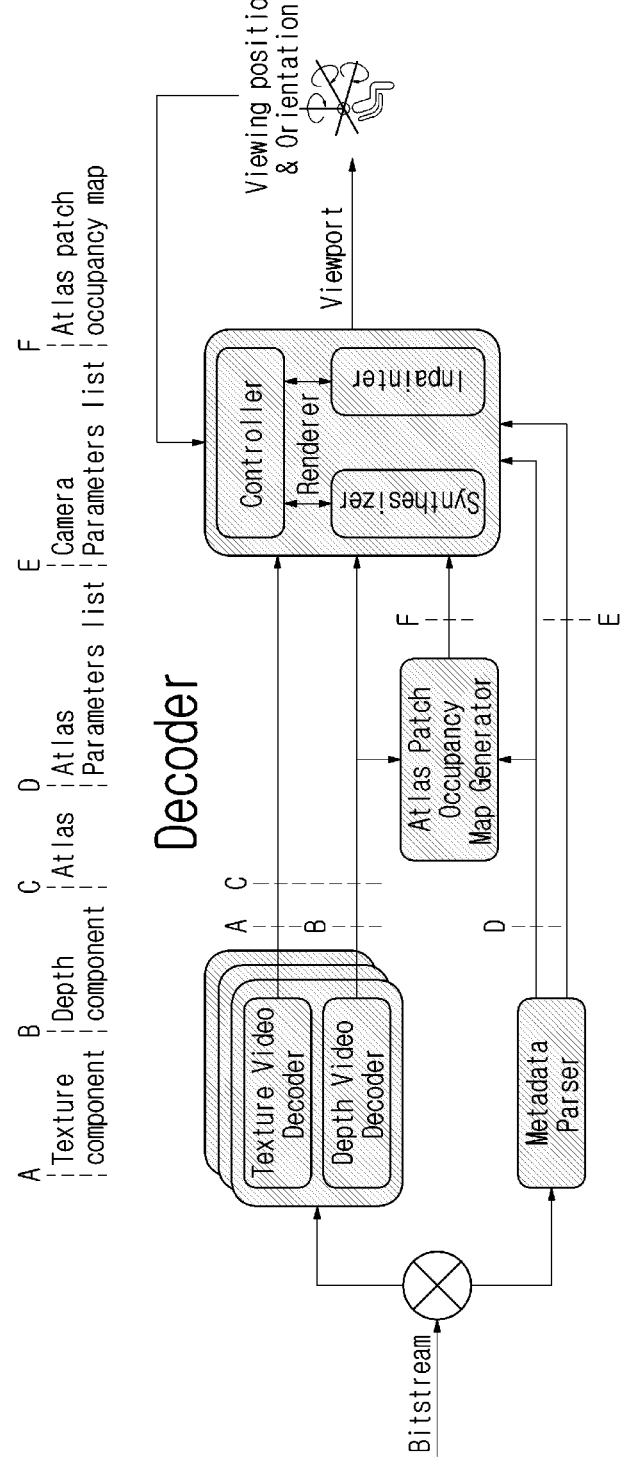

FIG. 2A and FIG. 2B are views schematically showing TMIV (Test Model for Immersive Video) encoder and decoder according to an embodiment of the present disclosure. Herein, a TMIV encoder may be an immersive image encoding apparatus, and a TMIV decoder may be an immersive image decoding apparatus.

Referring to FIG. 2A, an input of a TMIV encoder may be encoded sequentially through a view optimizer, an atlas constructor, a video texture encoder and a video depth encoder.

In a view optimizing process, the number of necessary basic views may be determined by considering a directional bias, a view. a distance, and an overlap of views. Next, in the view optimizing process, a basic view may be selected by considering a position and an overlap between views.

A pruner in the atlas constructor may preserve basic views by using a mask and remove an overlapping portion of additional views. An aggregator may update a mask used for a video frame in a chronological order.

Next, a patch packer may ultimately generate an atlas by packing each patch atlas. An atlas of a basic view may configure the same texture and depth information as the original one. An atlas of an additional view may have texture and depth information configured in a block patch form.

Referring to FIG. 2B, a TMIV decoder may reconstruct an atlas and a basic view for video texture and depth information. In addition, a finally reconstructed output may be generated through an atlas patch occupancy map generator and a renderer.

Specifically, the TMIV decoder may obtain a bitstream. In addition, texture and depth may be transmitted to the renderer via a texture video decoder and a depth video decoder. The renderer may be configured in three stages of controller, synthesizer and inpainter.

Figure 3A:
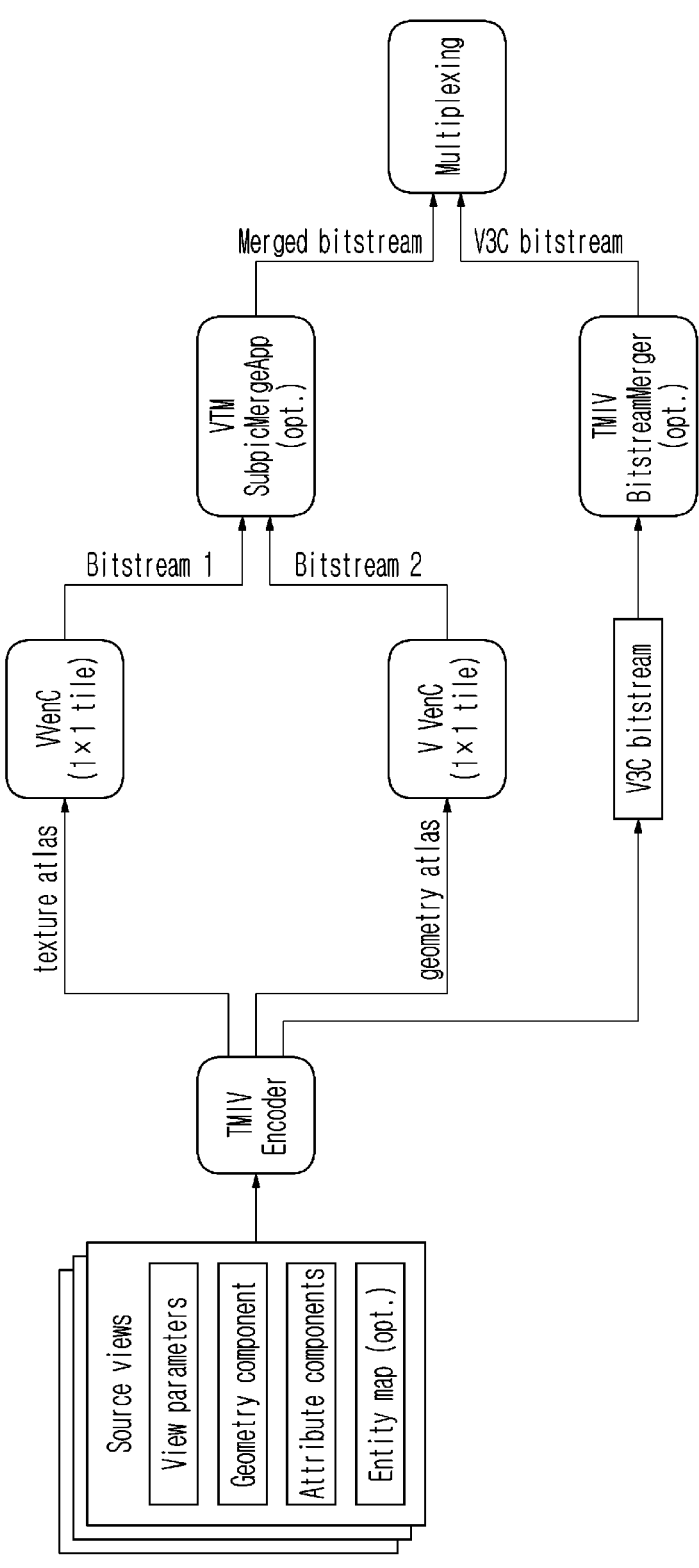
FIG. 3A is a view schematically showing a pipeline of an immersive image encoding apparatus to which embodiments of the present disclosure are applicable.
Figure 3B:
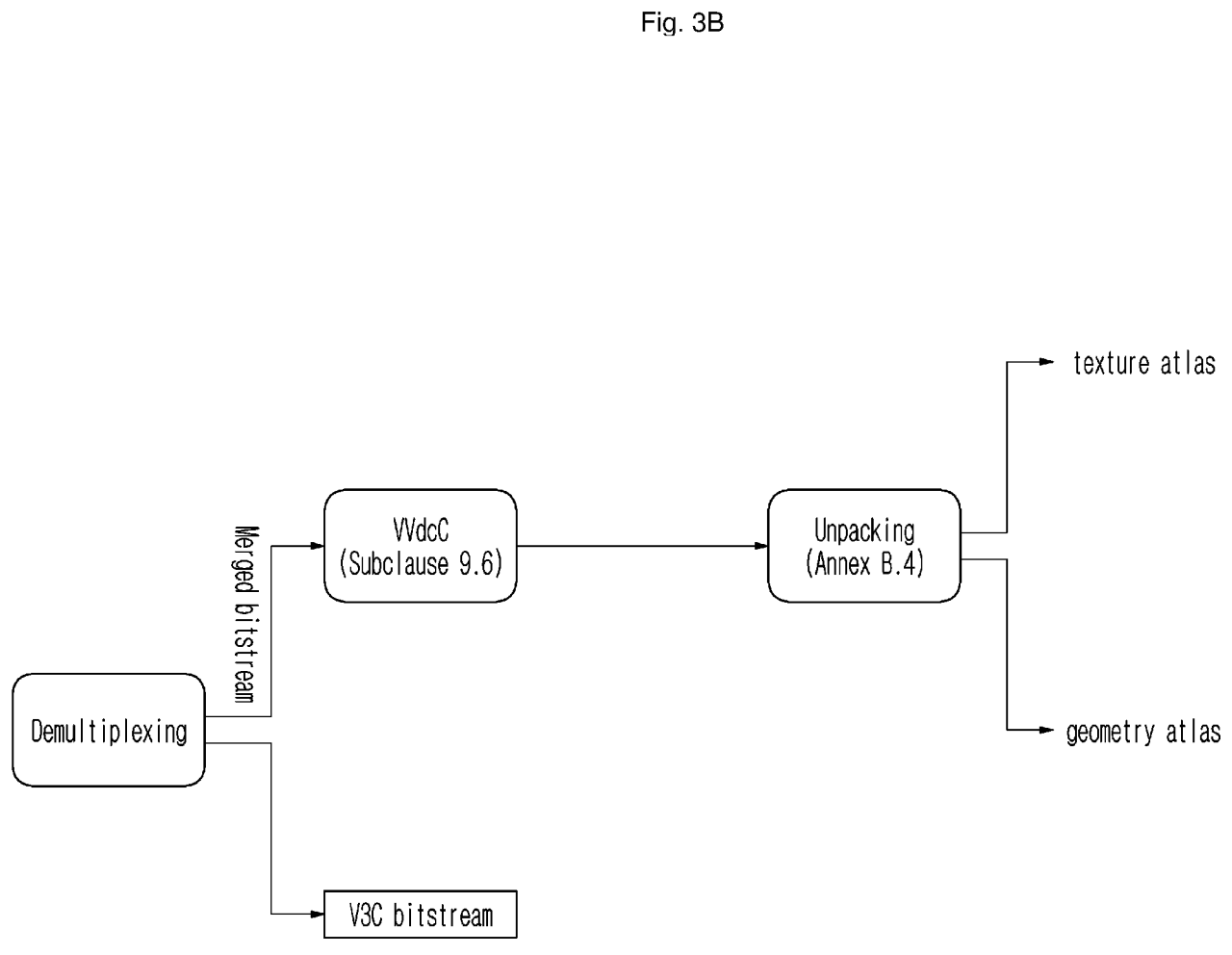

FIG. 3A is a view schematically showing a pipeline of an immersive image encoding apparatus to which embodiments of the present disclosure are applicable, and FIG. 3B is a view schematically showing a pipeline of an immersive image decoding apparatus to which embodiments of the present disclosure are applicable.

Referring to FIG. 3A, a TMIV encoder may obtain texture atlases and geometry atlases from source views. Geometry atlases may be obtained by a TMIV encoder through a method of dividing a geometry atlas (first geometry atlas) extracted from source views. In addition, geometry atlases thus divided may be obtained in a packed state based on a specific direction.

An encoder (versatile video encoder (VVenC)) located on the upper side may encode a texture atlas to generate Bitstream 1 corresponding to a texture bitstream. As an example, a texture atlas may be generated as Bitstream 1 by being encoded in 1×1 tile or 1×1 sub-picture. A texture bitstream may be a texture atlas bitstream.

An encoder (VVenC) located on the lower side may encode geometry atlases (packed geometry atlases) to generate Bitstream 2 corresponding to a geometry bitstream. As an example, packed geometry atlases may also be generated as Bitstream 2 by being encoded in 1×1 tile or 1×1 sub-picture. A geometry bitstream may be a geometry atlas bitstream.

Although FIG. 3A discloses an example of implementing encoders as VVenC, the encoders may also be implemented as encoders based on High-Efficiency Video Coding (HEVC), AOMedia Video 1 (AV1) and the like.

Bitstream 1 and Bitstream 2 may be input into a synthesizer (VTM (VVC Test Model) SubpicMergeApp) and be merged therein, and a merged bitstream may be generated as a result. SubpicMergeApp may be a sub-configuration for supporting a sub-picture merge function in the VTM. Bitstream 1 and Bitstream 2 may be synthesized at various positions. For example, Bitstream 2 (geometry bitstream) may be merged to be located to the right of Bitstream 1 (texture bitstream).

When merging bitstreams, since a texture atlas and a geometry atlas are located in a single tile or picture, a V3C bitstream including atlas and packing information needs to be modified. To this end, packing information is modified to be suitable for a tile or picture in a 'merged bitstream', and thus a modified V3C bitstream may be generated.

A merged bitstream and a modified V3C bitstream may be multiplexed to be unified into a single bitstream.

Referring to FIG. 3B, a unified bitstream may be demultiplexed to be output as a merged bitstream and a V3C bitstream. A combined bitstream may be output as a texture atlas and a geometry atlas through a decoding process (versatile video decoder (VVdeC)) and an unpacking process.

Although FIG. 3B discloses an example of implementing a decoder as VVdeC, the decoder may also be implemented as a decoder based on High-Efficiency Video Coding (HEVC), AOMedia Video 1 (AV1) and the like.

Embodiment 1

Figure 4:
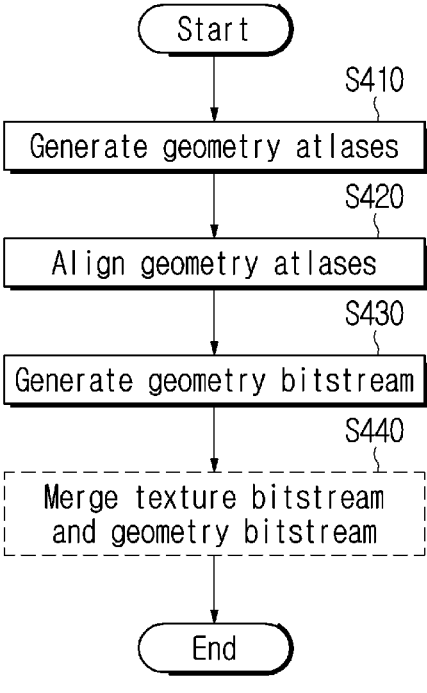
FIG. 4 is a flowchart showing an immersive image encoding method according to an embodiment of the present disclosure.

Embodiment 1 is an immersive image encoding method that packs geometry atlases and selectively merges bitstreams. FIG. 4 is a flowchart showing an immersive image encoding method according to Embodiment 1.

Referring to FIG. 4, an immersive image encoding apparatus may generate geometry atlases for an immersive image (S410).

Geometry atlases may be generated by dividing a first geometry atlas for an immersive image. Herein, the first geometry atlas may be a single atlas or region, and each of geometry atlases generated by dividing the first geometry atlas may also be a region with a predetermined size.

A division direction of the first geometry atlas and the number of geometry atlases may be determined based on a resolution of the geometry atlas (or geometry atlases) and a texture atlas.

Determining the division direction and the number may be intended to prevent no empty space from occurring when geometry atlases are placed in a texture atlas.

For example, if it is assumed that a texture atlas has a resolution of 4096×2176 and a first geometry atlas has a resolution of 2048×1088, the first geometry atlas may be divided into two geometry atlases with a resolution of 1024×1088. In this case, when the two geometry atlases are vertically packed, a height of the packed geometry atlases and a height of a texture atlas may be identical with each other.

Geometry atlases may be generated by dividing the first geometry atlas in various directions. For example, various directions like vertical direction, horizontal direction and diagonal direction may be directions of dividing the first geometry atlas.

The immersive image encoding apparatus may align geometry atlases generated by dividing the first geometry atlas (S420) and generate a geometry bitstream by encoding the aligned geometry atlases (S430).

The alignment process of step S420 may be a process of packing geometry atlases. Geometry atlases may be aligned in various directions. For example, geometry atlases may be aligned in vertical direction, horizontal direction, and diagonal direction.

A direction of dividing the first geometry atlas (division direction) and a direction of aligning geometry atlases (alignment direction) may be connected with each other. For example, to make a height for aligning geometry atlases and a height of a texture atlas correspond to each other, the first geometry atlas may be vertically divided, and geometry atlases may be vertically aligned. As another example, to make a width for aligning geometry atlases and a width of a texture atlas correspond to each other, the first geometry atlas may be horizontally divided, and geometry atlases may be horizontally aligned.

The packing process described above may be performed in a pixel domain.

According to embodiments, the immersive image encoding apparatus may merge a texture bitstream, which encodes a texture atlas, with a geometry bitstream (S440). The merging process of step S440 may be selectively performed and be performed in a bitstream domain.

The merging process may be performed in a tile unit or in a sub-picture unit. That is, a texture bitstream and a geometry bitstream may be merged in a tile unit or in a sub-picture unit.

A geometry bitstream may be merged at various positions of a texture bitstream. In other words, a geometry bitstream may be merged with a texture bitstream so that geometry atlases can be placed (or packed) to the right of a texture atlas.

A position where a geometry bitstream is merged may be various like top, right, left and bottom sides of a texture bitstream. A position where a geometry bitstream is merged may be determined according to a division direction of a geometry atlas and an alignment direction of geometry atlases.

For example, when the first geometry atlas is vertically divided and geometry atlases are vertically aligned so that a height for aligning the geometry atlases and a height of a texture atlas can correspond to each other, a geometry bitstream may be placed to the left or right of a texture bitstream.

As another example, when the first geometry atlas is horizontally divided and geometry atlases are horizontally aligned so that a width for aligning the geometry atlases and a width of a texture atlas can correspond to each other, a geometry bitstream may be placed on top of or at the bottom of a texture bitstream.

When a geometry bitstream is merged to the right of a texture bitstream (or a geometry atlas is packed to the right of a texture atlas), since tiles or sub-pictures can be divided into unit regions (e.g., CTU) of division, tiles or sub-pictures located at a last column and a last row need not be divided into the unit regions. Since texture atlases may have a width capable of being divided into unit regions and a height incapable of being divided into unit regions, a geometry atlas may be placed to the right of a texture atlas.

Figure 5:
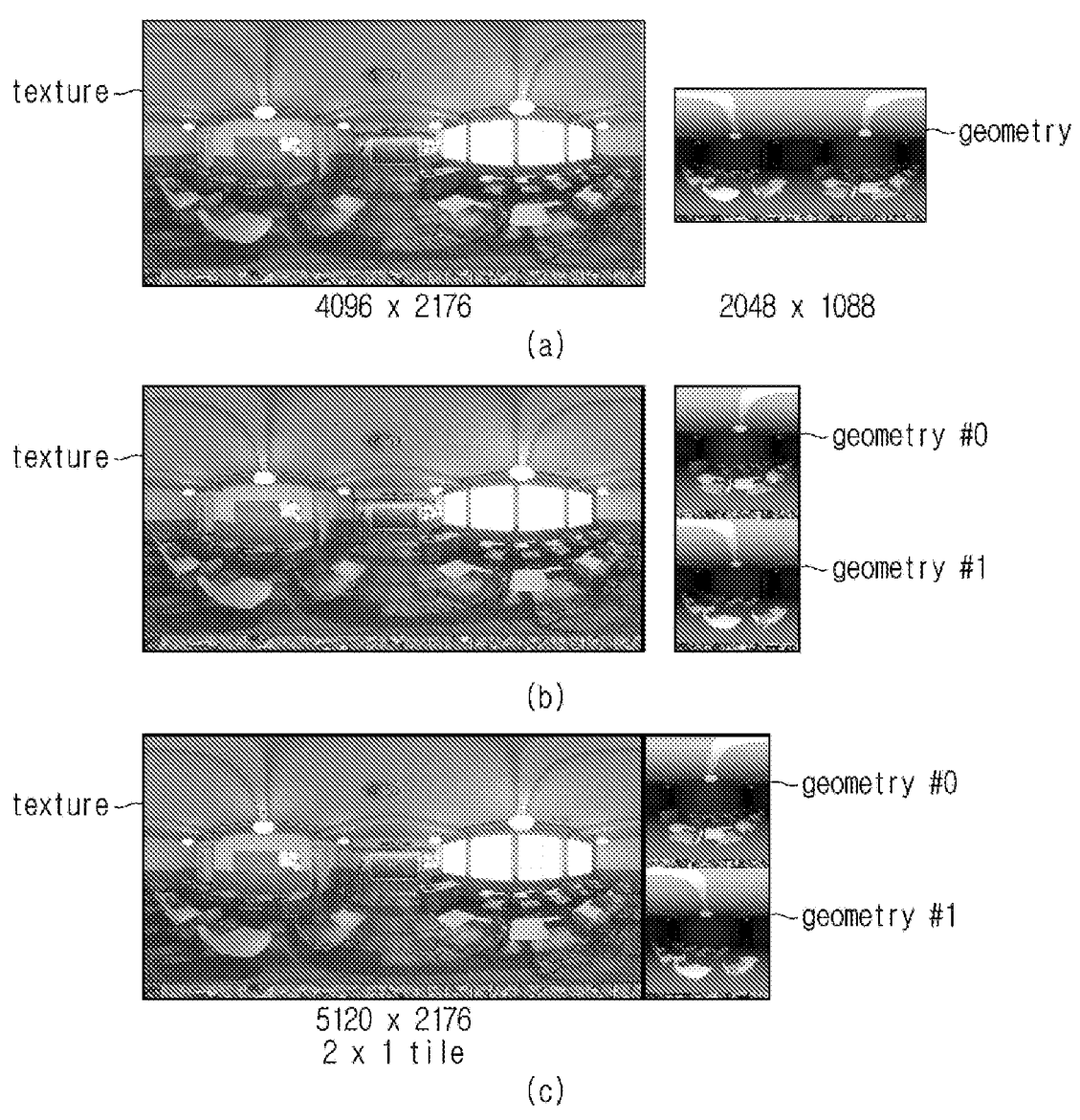
FIG. 5 is a view showing an example of atlas packing and merging according to an embodiment of the present disclosure.

FIG. 5 is a view showing an example of atlas packing and merging according to an embodiment of the present disclosure.

As exemplified in (a) of FIG. 5, a texture atlas has a resolution of 4096×2176, and a first geometry atlas has a resolution of 2048×1088. In this case, the first geometry atlas may be divided into a geometry atlas (geometry #0)

with a resolution of 1048×1088 and a geometry atlas (geometry #1) with the resolution of 1048×1088.

As exemplified in (b) of FIG. 5, the geometry atlases geometry #0 and geometry #1 may be packed in vertical direction. As a result, the height 2176 of the aligned geometry atlases geometry #0 and geometry #1 and a height of a texture atlas may correspond to each other.

As exemplified in (c) of FIG. 5, a geometry bitstream, which encodes the geometry atlases geometry #0 and geometry #1, may be placed and merged to the right of a texture bitstream that encodes the texture atlas.

Embodiment 2

Figure 6:
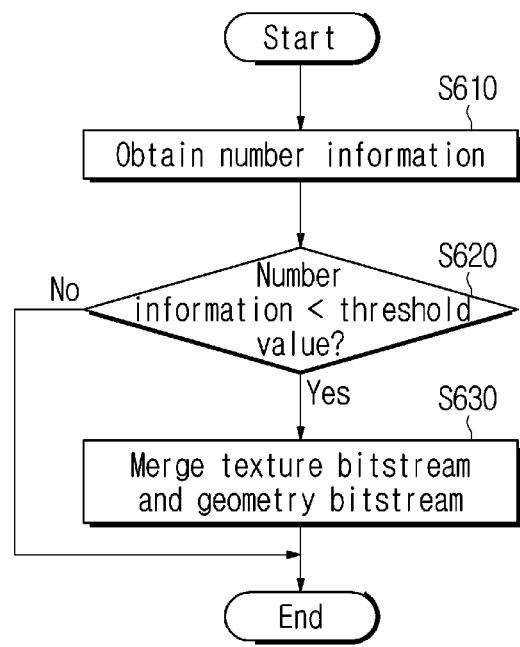
FIG. 6 is a flowchart showing an immersive image encoding method according to another embodiment of the present disclosure.

Embodiment 2 is a method of determining whether or not to merge based on the number of immersive image decoding apparatuses. FIG. 6 is a flowchart showing an immersive image encoding method according to Embodiment 2.

Referring to FIG. 6, an immersive image encoding apparatus may obtain information on the number of immersive image decoding apparatuses (number information) (S610) and determine whether or not to merge a bitstream based on the number information (S620, S630).

For example, the immersive image encoding apparatus may compare the number information with a threshold value (S620) and, when the number information is below the threshold value, merge a texture bitstream with a geometry bitstream (S630). The threshold value may be determined based on the number of immersive image decoding apparatuses. For example, the threshold value may be the same as the number of immersive image decoding apparatuses.

Thus, in the present disclosure, as bitstreams are merged based on the number of immersive image decoding apparatuses, not only the number of generated bitstreams but also the number of immersive image decoding apparatuses may be reduced.

Accordingly, the present disclosure may solve the problem of synchronization, which occurs in parallel processing of bitstreams using many immersive image decoding apparatuses, and reduce a latency increase in sequential processing of the bitstreams.

Embodiment 3

Figure 7:
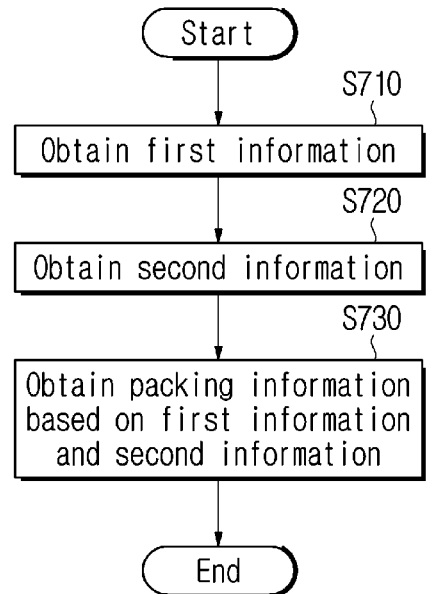
FIG. 7 is a flowchart showing an immersive image decoding method according to an embodiment of the present disclosure.

Embodiment 3 is a method of signaling and obtaining packing information. FIG. 7 is a flowchart showing an immersive image decoding method according to Embodiment 3 of the present disclosure.

Referring to FIG. 7, an immersive image encoding apparatus may signal first information and second information, and an immersive image decoding apparatus may obtain the first information and the second information (S710, S720).

The first information may indicate whether or not an atlas for an immersive image has packed data (packing information). The second information may indicate whether or not an atlas for an immersive image has packed geometry data (geometry information).

The immersive image encoding apparatus may signal packing information based on whether or not an atlas for an immersive image has packed data or whether or not an atlas for an immersive image has packed geometry data.

The immersive image decoding apparatus may obtain the packing information based on the first information and the second information (S730). For example, packing information may be obtained when the first information indicates that an atlas for an immersive image has packed data or when the second information indicates that an atlas for an immersive image has packed geometry data.

A syntax structure for signaling of packing information is shown in Table 1.

TABLE 1

| | Descriptor |
| --- | --- |
| v3c_parameter_set(?numBytesInV3CPayload) { | |
|   vps_extension_present_flag | u(1) |
|   if(vps_extension_present_flag) { | |
|     vps_packing_information_present_flag | u(1) |
|     vps_miv_extension_present_flag | u(1) |
|     vps_extension_6bits | u(6) |
|   } | |
|   if(vps_packing_information_present_flag) { | |
|     for(k=0; k <= vps_atlas_count_minus1; k++) { | |
|       j=vps_atlas_id[k] | |
|       vps_packed_video_present_flag[j] | |
|       vps_geometry_packing_enabled_flag[j] | |
|       if(vps_packed_video_present_flag[j] \|\| | |
| vps_geometry_packing_enabled_flag[j]) | |
|         packing_information(j) | |
|     } | |
|   } | |

In Table 1, vps_packing_information_present_flag indicates whether or not packing information exists, vps_packed_video_present_flag[j] indicates first information, vps_geometry_packing_enabled_flag [j] indicates second information, and packing_information(j) indicates packing information.

vps_packing_information_present_flag=1 may indicate that packing information exists, and vps_packing_information_present_flag=0 may indicate that packing information does not exist.

vps_packed_video_present_flag[j]=1 may indicate that a j-th atlas has packed data, and vps_packed_video_present_flag[j]=0 may indicate that the j-th atlas has no packed data.

vps_geometry_packing_enabled_flag[j]=1 may indicate that the j-th atlas has packed geometry data, and vps_geometry_packing_enabled_flag[j]=0 may indicate that the j-th atlas has no packed geometry data.

Figure 8:
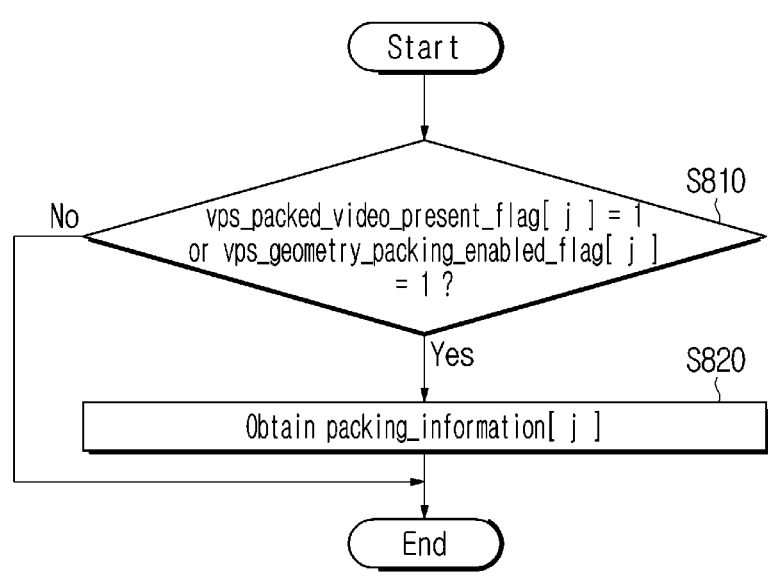
FIG. 8 is a flowchart showing an immersive image decoding method according to another embodiment of the present disclosure.

An example for a method of obtaining packing information based on the syntax structure of Table 1 is shown in FIG. 8.

Referring to FIG. 8, an immersive image decoding apparatus may determine values of vps_packed_video_present_flag[j] and vps_geometry_packing_enabled_flag[j] (S810).

The immersive image decoding apparatus may obtain packing_information(j), when vps_packed_video_present_flag[j]=1 or vps_geometry_packing_enabled_flag[j]=1 (S820).

A syntax structure for signaling the presence or absence of packing information is shown in Table 2.

TABLE 2

| | Descriptor |
| --- | --- |
| v3c_parameter_set(numBytesInV3CPayload) { | |
|   for(k=0; k <= vps_atlas_count_minus1; k++) { | |
|     j=vps_atlas_id[k] | |
|     vps_geometry_video_present_flag[ j ] | u(1) |
|     vps_attribute_video_present_flag[ j ] | u(1) |
|     vps_extension_present_flag | u(1) |
|     if(vps_extension_present_flag) { | |
|       vps_packing_information_present_flag | u(1) |
|       vps_miv_extension_present_flag | u(1) |
|       vps_extension_6bits | u(6) |
|     } | |

TABLE 2-continued

| | Descriptor |
| --- | --- |
|     if(vps_packing_information_present_flag) { | |
|       vps_packed_video_present_flag[j] | |
|       if(vps_packed_video_present_flag[j]) | |
|         packing_information(j) | |
|     } | |
|   } | |

In Table 2, vps_geometry_video_present_flag indicates whether or not a geometry atlas exists, and vps_attribute_video_present_flag indicates whether or not a texture atlas exists.

vps_geometry_video_present_flag=1 may indicate that a geometry atlas exists apart from a packed atlas, and vps_geometry_video_present_flag=0 may indicate that no geometry atlas exists apart from a packed atlas.

vps_attribute_video_present_flag=1 may indicate that a texture atlas exists apart from a packed atlas, and vps_attribute_video_present_flag=0 may indicate that no texture atlas exists apart from a packed atlas.

vps_packing_information_present_flag indicates whether or not packing information exists, vps_packed_video_present_flag[j] indicates first information, and packing_information(j) indicates packing information that is second information.

vps_packing_information_present_flag=1 may indicate that packing information exists, and vps_packing_information_present_flag=0 may indicate that packing information does not exist.

vps_packed_video_present_flag[j]=1 may indicate that a j-th atlas has packed data, and vps_packed_video_present_flag[j]=0 may indicate that the j-th atlas has no packed data.

vps_packing_information_present_flag indicates whether or not packing information exists, vps_packed_video_present_flag[j] indicates first information, and packing_information(j) indicates packing information that is second information.

vps_packing_information_present_flag=1 may indicate that packing information exists, and vps_packing_information_present_flag=0 may indicate that packing information does not exist.

vps_packed_video_present_flag[j]=1 may indicate that a j-th atlas has packed data, and vps_packed_video_present_flag[j]=0 may indicate that the j-th atlas has no packed data.

Another syntax structure for signaling of packing information is shown in Table 3.

TABLE 3

| | Descriptor |
| --- | --- |
| packing_information( j ) { | |
|   pin_geometry_present_flag[ j ] | u(1) |
|   pin_attribute_present_flag[ j ] | u(1) |
|   pin_regions_count_minus1[ j ] | ue(v) |
|   for( i = 0; i <= pin_regions_count_minus1[ j ]; i++) { | |
|     pin_region_type_id_minus2[ j ][ i ] | u(2) |
|     pin_region_top_left_x[j][i] | u(16) |
|     pin_region_top_left_y[j][i] | u(16) |
|     pin_region_width_minus1[j][i] | u(16) |
|     pin_region_height_minus1[j][i] | u(16) |
|     pin_region_unpack_top_left_x[j][i] | u(16) |
|     pin_region_unpack_top_left_y[j][i] | u(16) |
|     pin_region_rotation_flag[j][i] | u(1) |
|   } | |
| } | |

In Table 3, pin_geometry_present_flag indicates whether or not a geometry atlas exists in a packed atlas, and pin_attribute_present_flag indicates whether or not a texture atlas exists in a packed atlas.

pin_geometry_present_flag=1 may indicate that a geometry atlas exists in a packed atlas, and pin_geometry_present_flag=0 may indicate that no geometry atlas exists in a packed atlas.

pin_attribute_present_flag=1 may indicate that a texture atlas exists in a packed atlas, and pin_attribute_present_flag=0 may indicate that no texture atlas exists in a packed atlas.

pin_regions_count_minus1 indicates a value equal to a predetermined number of regions within a packed atlas minus 1. pin_region_type_id_minus2 indicates a type of a region. Table 4 shows a type of a region and a value of pin_region_type_id_minus2.

TABLE 4

| vuh_unit_type | pin_region_type_id_minus2 | Identifier | V3C unit type | Description |
|---|---|---|---|---|
| 3 | 1 | V3C_GVD | Geometry video data | Geometry information |
| 4 | 2 | V3C_AVD | Attribute video data | Attribute information |
| 5 | 3 | V3C_PVD | Packed video data | Packing information |

In Table 4, vuh_unit_type has a value equal to pin_region_type_id_minus2 plus 2. pin_region_type_id_minus2=1 indicates that the region is divided in a geometry atlas, pin_region_type_id_minus2=2 indicates that the region is divided in a texture atlas, and pin_region_type_id_minus2=3 indicates that the region is divided in a packed atlas.

In Table 3, pin_region_top_left_x indicates a top left x coordinate in a packed atlas, and pin_region_top_left_y indicates a top left y coordinate in a packed atlas. pin_region_width_minus1 indicates a value equal to a width of a region minus 1, and pin_region_height_minus1 indicates a value equal to a height of a region minus 1. pin_region_unpack_top_left_x indicates a top left x coordinate in an unpacked atlas when unpacking a packed atlas, and pin_region_unpack_top_left_y indicates a top left y coordinate in an unpacked atlas when unpacking a packed atlas.

pin_region_rotation_flag indicates whether or not a region is rotated in a packed atlas. pin_region_rotation_flag=1 indicates that a region rotates 90 degrees in a packed atlas, and pin_region_rotation_flag=0 indicates that a region has not rotated in a packed atlas.

Figure 9:
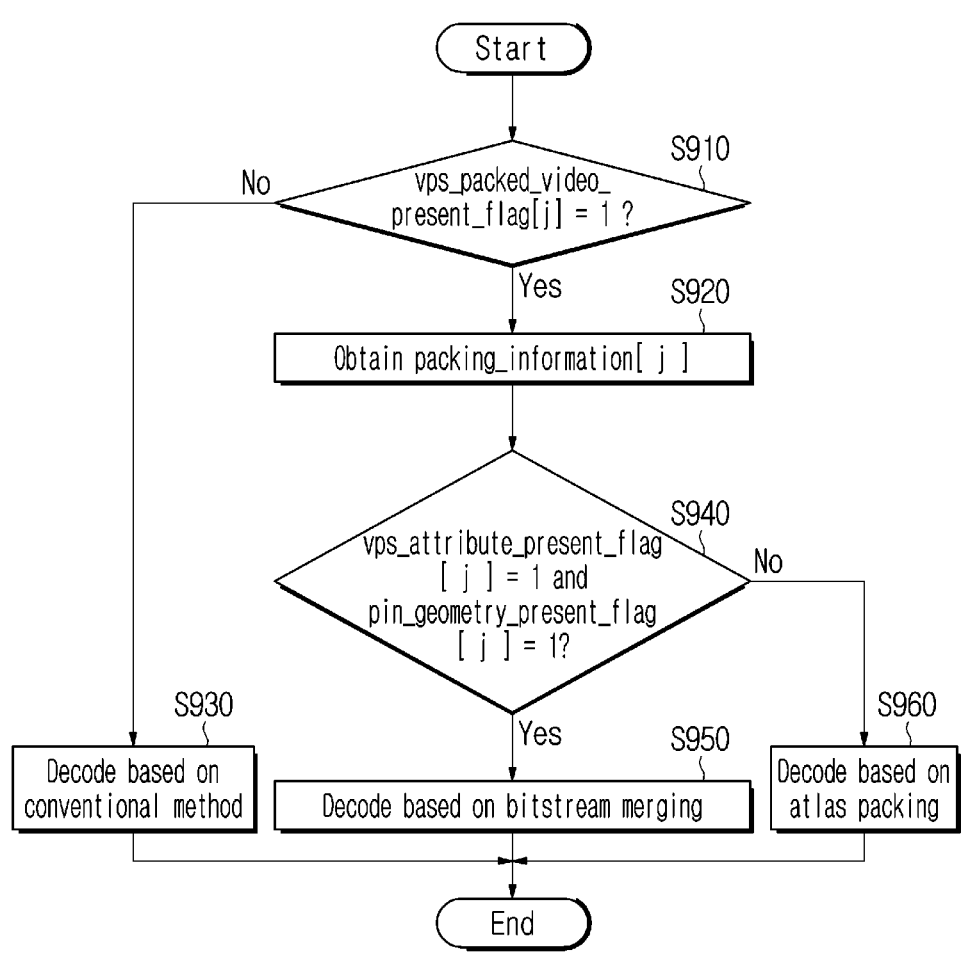
FIG. 9 is a view showing an example of an immersive image decoding method to which embodiments of the present disclosure are applicable.

An example for a method of obtaining packing information based on the syntax structures of Table 2 and Table 3 is shown in FIG. 9.

Referring to FIG. 9, an immersive image decoding apparatus may determine a value of vps_packed_video_present_flag[j] (S910). The immersive image decoding apparatus may obtain packing_information(j), when vps_packed_video_present_flag[j]=1 (S920). When vps_packed_video_present_flag[j]=0, the immersive image decoding apparatus may perform decoding based on a conventional method, determining that packing is not applied.

The immersive image decoding apparatus may determine values of vps_attribute_present_flag[j] and pin_geometry_present_flag[j] (S940). When vps_attribute_present_flag[j]=1 and pin_geometry_present_flag[j]=1, the immersive image decoding apparatus may perform decoding based on bitstream merge according to the present disclosure, determining that a geometry atlas is included in a packed atlas and a texture atlas is separately transmitted (S950).

When vps_attribute_present_flag[j]=0 or pin_geometry_present_flag[j]=0, the immersive image decoding apparatus may perform decoding based on atlas packing according to the present disclosure, determining that a packed atlas includes only a geometry atlas and a texture atlas is not packed (S960).

Comparison with the Conventional Methods

In Table 5, the conventional methods and the methods of the present disclosure are compared by focusing on the syntaxes of Table 1 to Table 3.

TABLE 5

| Mode | vps_geometry_video_present_flag | vps_attribute_video_present_flag | packing_information_present_flag | pin_geometry_present_flag | pin_attribute_present_flag |
|---|---|---|---|---|---|
| MIV main (A17) | 1 | 1 | 0 | — | — |
| Frame packing (P17) | 0 | 0 | 1 | 1 | 1 |
| Proposed geometry packing only (GP17) | 0 | 1 | 1 | 1 | 0 |

TABLE 5-continued

| Mode | vps_geometry_video_ present_flag | vps_attribute_video_ present_flag | packing_information_ present_flag | pin_geometry_ present_flag | pin_attribute_ present_flag |
|---|---|---|---|---|---|
| Proposed geometry packing + bitstream merging (GPM17) | 0 | 0 | 1 | 1 | 1 |

In Table 5, MIV main(A17) indicates an encoding condition of a frame using an MIV mode with no frame packing being applied, Frame packing(P17) indicates a condition for applying a frame packing technique adopted in TMIV for a TMIV mode, Proposed geometry packing only(GP17) indicates a condition for applying a geometry packing technique proposed by the present disclosure for geometry in an MIV mode, and Proposed geometry packing+bitstream merging (GPM17) indicates a condition for applying bitstream merge to GP17.

Since MIV main does not apply frame packing, packing_information_present_flag has a value of 0, and since there is no packing_information( ) syntax, pin_geometry_present_ flag and pin_attribute_present_flag have no value. In addition, since MIV main has unpacked texture and geometry atlases, vps_geometry_video_present_flag and vps_attribute_video_present_flag have a value of 1.

Since Frame packing includes texture and geometry atlases in a packed atlas, vps_geometry_video_present_flag and vps_attribute_video_present_flag have a value of 0, and packing_information_present_flag, pin_geometry_present_ flag and pin_attribute_present_flag have a value of 1.

Since Proposed geometry packing only does not perform packing for texture but perform packing only for geometry, vps_geometry_video_present_flag has a value of 0, vps_attribute_present_flag has a value of 1, and packing_information_present_flag has a value of 1. Since a packed atlas has a geometry atlas but no texture atlas, pin_geometry_present_ flag has a value of 1, and pin_attribute_present_flag has a value of 0.

Since Proposed geometry packing+bitstream merging performs both a packing technique and a merging technique, vps_geometry_video_present_flag and vps_attribute_present_flag have a value of 0, and packing_information_present_flag, pin_geometry_present_flag and pin_attribute_present_flag have a value of 1.

Table 6 shows testing results for conventional methods and methods of the present disclosure with focus on a bit rate (Kbps) of V3C bitstream.

TABLE 6

| Sequence | A17 | P17 | GP17 | GPM17 |
|---|---|---|---|---|
| ClassroomVideo | 236.27 | 237.55 | 237.14 | 237.50 |
| Museum | 151.51 | 152.79 | 152.38 | 152.73 |
| Painter | 264.55 | 265.83 | 265.42 | 265.77 |
| Frog | 208.61 | 209.90 | 209.49 | 209.84 |
| Kitchen | 274.13 | 275.42 | 275.01 | 275.36 |
| Chess | 138.00 | 139.28 | 138.87 | 139.22 |
| Fan | 202.85 | 204.14 | 203.73 | 204.08 |
| Carpark | 52.18 | 53.25 | 52.91 | 53.21 |
| Group | 223.55 | 224.83 | 224.42 | 224.78 |
| Average | 194.62 | 195.88 | 195.48 | 195.83 |

In Table 6, a bit rate of GPM17 is calculated for a V3C bitstream that is output by inputting a V3C bitstream, which is generated in GP17 condition, into BitstreamMerger. In comparison with A17 where frame packing is not applied, P17, GP17 and GPM17, where frame packing is applied, additionally store packing_information( ) syntax so that a bit rate increase as small as about 1 Kbps is observed. Accordingly, even when frame packing and proposed geometry packing are applied, a V3C bitstream bit rate increase is small or hardly exists, and this means that the proposed technique has a slight increase of complexity as compared with when the existing frame packing is not applied.

Table 7 shows testing results for conventional methods and methods of the present disclosure with focus on MIV encoding time (second).

TABLE 7

| Sequence | A17 | P17 | GP17 | GPM17 |
|---|---|---|---|---|
| ClassroomVideo | 4053.62 | 4134.12 | 4245.95 | — |
| Museum | 4633.15 | 4696.66 | 4640.76 | — |
| Painter | 1024.71 | 1084.07 | 1049.23 | — |
| Frog | 853.232 | 789.99 | 793.66 | — |
| Kitchen | 1811.91 | 1795.14 | 1737.90 | — |
| Chess | 1792.32 | 1703.61 | 1712.62 | — |
| Fan | 1057.66 | 1065.12 | 975.04 | — |
| Carpark | 539.84 | 501.66 | 500.65 | — |
| Group | 1664.13 | 1532.05 | 1554.94 | — |
| Average | 1936.73 | 1922.49 | 1912.30 | — |

Since GPM17 applies only bitstream merging to GP17 and an atlas used herein is generated in GP17 condition, MIV encoding time for GPM17 is not illustrated. Like bit rate, each mode showed no significant difference in MIV encoding time, and the proposed geometry packing technique can be widely used since it has a similar degree of complexity to an existing technique.

The conventional frame packing technique provides a fixed number of atlases and bitstreams by applying packing only at a pixel level, while the geometry packing technique proposed by the present disclosure can provide an adaptive streaming service by using a small number of resources when providing an immersive image streaming service, since it can adjust the number of atlases and bitstreams through bitstream merging that requires highly lightweight computation.

In the above-described embodiments, the methods are described based on the flowcharts with a series of steps or units, but the present disclosure is not limited to the order of the steps, and rather, some steps may be performed simultaneously or in different order with other steps.

In addition, it should be appreciated by one of ordinary skill in the art that the steps in the flowcharts do not exclude each other and that other steps may be added to the flowcharts or some of the steps may be deleted from the flowcharts without influencing the scope of the present disclosure.

The above-described embodiments include various aspects of examples. All possible combinations for various aspects may not be described, but those skilled in the art will be able to recognize different combinations. Accordingly, the present disclosure may include all replacements, modifications, and changes within the scope of the claims.

The embodiments of the present disclosure may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present disclosure, or well-known to a person of ordinary skilled in computer software technology field. Examples of the computer-readable recording medium include magnetic recording media such as hard disks, floppy disks and magnetic tapes; optical data storage media such as CD-ROMs and DVD-ROMs; magneto-optimum media like floptical disks; and hardware devices, such as read-only memory (ROM), random-access memory (RAM), flash memory, etc., which are particularly structured to store and implement program instructions. Examples of the program instructions include not only a mechanical language code formatted by a compiler but also a high level language code that may be implemented by a computer using an interpreter. The hardware devices may be configured to be operated by one or more software modules or vice versa to conduct the processes according to the present disclosure.

In the above-described embodiments, the methods are described based on the flowcharts with a series of steps or units, but the present disclosure is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present disclosure.

The above-described embodiments include various aspects of examples. All possible combinations for various aspects may not be described, but those skilled in the art will be able to recognize different combinations. Accordingly, the present disclosure may include all replacements, modifications, and changes within the scope of the claims.

The embodiments of the present disclosure may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present disclosure, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present disclosure.

Although the present disclosure has been described in terms of specific items such as detailed elements as well as the limited embodiments and the drawings, they are only provided to help more general understanding of the disclosure, and the present disclosure is not limited to the above embodiments. It will be appreciated by those skilled in the art to which the present disclosure pertains that various modifications and changes may be made from the above description.

Therefore, the spirit of the present disclosure shall not be limited to the above-described embodiments, and the entire scope of the appended claims and their equivalents will fall within the scope and spirit of the disclosure.

What is claimed is:

1. An immersive image encoding method performed in an immersive image encoding apparatus, the method comprising:
   generating geometry atlases for an immersive image;
   aligning the geometry atlases to make an alignment height of the geometry atlases correspond to a height of a texture atlas; and
   generating a geometry bitstream by encoding the aligned geometry atlases,
   wherein the geometry atlases are generated by dividing a first geometry atlas for the immersive image, and
   wherein a number of the geometry atlases are determined based on a resolution of the first geometry atlas.

2. The immersive image encoding method of claim 1,
   wherein a division direction of the first geometry atlas is determined based on the resolution of the first geometry atlas and the texture atlas, and
   wherein the number of the geometry atlases are determined based on the texture atlas.

3. The immersive image encoding method of claim 1, wherein the geometry atlases are generated by dividing the first geometry atlas in a vertical direction.

4. The immersive image encoding method of claim 3, wherein the geometry atlases are aligned in the vertical direction.

5. The immersive image encoding method of claim 1, further comprising merging a texture bitstream, which encodes the texture atlas, and the geometry bitstream.

6. The immersive image encoding method of claim 5, wherein the texture bitstream and the geometry bitstream are merged in a unit of tile or sub-picture.

7. The immersive image encoding method of claim 5, wherein the merging comprises:
   obtaining information on a number of immersive image decoding apparatuses; and
   determining, based on the information on the number, whether or not to merge the texture bitstream and the geometry bitstream.

8. The immersive image encoding method of claim 5, wherein the geometry bitstream is merged with the texture bitstream so that the geometry atlases are placed on a right side of the texture atlas.

9. An immersive image decoding method performed in an immersive image decoding apparatus, the method comprising:
   obtaining, from a bitstream, first information indicating whether or not an atlas for an immersive image has packed data;

obtaining, from a bitstream, second information indicating whether or not the atlas has packed geometry data; and obtaining packing information for the atlas based on the first information or the second information, wherein the packing information includes information on an aligned geometry atlases, wherein the packed geometry data includes geometry atlases, and wherein a resolution of an unpacked geometry atlas is determined based on a number of the geometry atlases.

10. The immersive image decoding method of claim 9, wherein the packing information is obtained, when the first information indicates that the atlas has packed data.

11. The immersive image decoding method of claim 9, wherein the packing information is obtained, when the second information indicates that the geometry atlas has packed data.

12. An immersive image encoding apparatus, comprising:
a memory; and
at least one processor,
wherein the at least one processor is configured to:
generate geometry atlases for an immersive image, align the geometry atlases to make an alignment height of the geometry atlases correspond to a height of a texture atlas, and
generate a geometry bitstream by encoding the aligned geometry atlases,
wherein the geometry atlases are generated by dividing a first geometry atlas for the immersive image, and
wherein a number of the geometry atlases are determined based on a resolution of the first geometry atlas.

13. A method for transmitting a bitstream generated by an immersive image encoding method, wherein the immersive image encoding method comprises:
generating geometry atlases for an immersive image;
aligning the geometry atlases to make an alignment height of the geometry atlases correspond to a height of a texture atlas; and
generating a geometry bitstream by encoding the aligned geometry atlases,
wherein the geometry atlases are generated by dividing a first geometry atlas for the immersive image, and
wherein a number of the geometry atlases are determined based on a resolution of the first geometry atlas.

* * * * *